United States Patent [19]
Yamamoto et al.

[11] Patent Number: 6,088,071
[45] Date of Patent: Jul. 11, 2000

[54] AUXILIARY CAPACITOR FOR A LIQUID CRYSTAL DISPLAY DEVICE

[75] Inventors: Kayo Yamamoto; Yasuyuki Hanazawa, both of Kanagawa-ken, Japan

[73] Assignee: Kabushiki Kaisha Toshiba, Kawasaki, Japan

[21] Appl. No.: 09/026,512

[22] Filed: Feb. 19, 1998

[30] Foreign Application Priority Data

Feb. 28, 1997 [JP] Japan ................................. 9-046690

[51] Int. Cl.⁷ ................................................ G02F 1/1343
[52] U.S. Cl. ................................ 349/38; 349/44; 438/30
[58] Field of Search .................................... 349/38, 39, 42, 349/111, 44, 140; 438/155, 30

[56] References Cited

U.S. PATENT DOCUMENTS

| | | | |
|---|---|---|---|
| 5,182,620 | 1/1993 | Shimada et al. | 257/70 |
| 5,182,661 | 1/1993 | Ikeda et al. | 349/39 |
| 5,721,601 | 2/1998 | Yamaji et al. | 349/138 |
| 5,767,927 | 6/1998 | Jang | 349/39 |

FOREIGN PATENT DOCUMENTS 7-20494  1/1995  Japan .

*Primary Examiner*—Kenneth Parker
*Attorney, Agent, or Firm*—Finnegan, Henderson, Farabow, Garrett & Dunner, L.L.P.

[57] ABSTRACT

A liquid crystal display device having an array substrate, a counter substrate and liquid crystal material between these two substrates. The array substrate has a plurality of pixel electrodes and auxiliary capacitors corresponding to each of the pixel electrodes. The auxiliary capacitor has a MOS structure comprising a lower electrode made of semiconductor material, an upper electrode made of metal material, and insulating layer between these two electrodes. The upper electrode has a notch region. Therefore, hydrogen is doped into the semiconductor from the notch region, not only from the edge portion uncovered by the upper electrode. In accordance with this composition, it is possible to reduce the manufacturing cost, to realize high characteristic display, and so on.

12 Claims, 7 Drawing Sheets

AUXILIARY CAPACITOR FOR A LIQUID CRYSTAL DISPLAY DEVICE

BACKGROUND OF THE INVENTION

1. Field of the Invention

This invention relates to a liquid display device with an auxiliary capacitor corresponding to a pixel electrode.

More specifically, the invention relates to the structure of the auxiliary capacitor.

2. Description of the Related Art

Liquid crystal display devices have been widely used as display devices for TV sets and graphics display devices due to their advantageous features of thin structure and low power consumption. Because an active matrix type liquid crystal display device using thin film transistors (referred to as TFTs) as switching devices has the characteristics of high speed response and high precision, the liquid crystal display device is attractive for high picture quality, large size, and color pictures.

The liquid display device of such an active matrix type is generally composed of an array substrate, a counter substrate, and a liquid crystal layer held between these two substrates. The array substrate has a plurality of pixel electrodes each of them connected to a switching device (such as a TFT). On the other hand, the counter substrate has a counter electrode.

Such a liquid crystal display device as described above displays a picture by the capacitor made of the pixel electrode, the counter electrode, and the liquid crystal which is held between these electrodes.

Furthermore, in order to prevent the liquid crystal capacitor from discharging, an auxiliary capacitor is connected to the capacitor stored in the liquid crystal with parallel circuit relations.

One of the structures of this auxiliary capacitor is disclosed in Japanese Unexamined Patent Publication Hei 7-20494. This auxiliary capacitor comprises a lower electrode made of semiconductor material, an upper electrode made of metal material, and an insulation film held between the lower electrode and the upper electrode, and is called a MOS structure.

The length of the channel is important for such a MOS capacitor. If the length of the channel is too long, the resistance of the lower electrode is high, which causes a slow speed of response. As a result, the display quality is remarkably deteriorated.

Furthermore, if the semiconductor is made of polycrystalline silicon, the semiconductor layer needs to be hydrogenated. An object of the hydrogenation is to terminate dangling bonds in the semiconductor. Because the hydrogenation process is generally carried out after forming the insulating film and the upper electrode on the semiconductor, the upper electrode prevents hydrogen from getting into the semiconductor. In other words, the hydrogenation starts at the region not covered by the upper electrode, and then spreads to the region covered by the upper electrode. As a result, hydrogenating the whole region of the semiconductor takes a very long time.

If the time of hydrogenation is not enough, the region covered by the upper electrode, especially in the vicinity of the center region of the semiconductor, has many dangling bonds which causes the problem that the semiconductor does not function as the auxiliary capacitor, thus causing the deterioration of the display characteristic.

SUMMARY OF THE INVENTION

The present invention overcomes the problems described above.

An object of the present invention is to provide a liquid crystal display device which has good display characteristics and which can be produced in a short time.

To achieve this object and in accordance with the purpose of the invention as embodied and broadly described herein, the liquid crystal display device of this invention comprises an array substrate; a plurality of scanning lines and signal lines on the array substrate in a matrix fashion; a plurality of thin film transistors, each in the vicinity of an intersection of the scanning lines and the signal lines; a plurality of pixel electrodes, each connected to one of the thin film transistors; a plurality of auxiliary capacitors, each connected to one of said pixel electrodes, each of the auxiliary capacitors, including a first electrode over the array substrate, an insulating layer over the first electrode, and a second electrode over the first electrode; an insulating layer being between the first electrode and the second electrode; a counter substrate opposite the array substrate; and a liquid crystal layer between the array substrate and the counter substrate, the second electrode having a notch region overlapping the first electrode, each of the pixel electrodes being connected to the first electrode through a contact hole of the insulating layer, and the first electrode having an edge region extending from an edge of the second electrode in a plane.

BRIEF DESCRIPTION OF THE DRAWINGS

FIG. 3.

DESCRIPTION OF THE PREFERRED EMBODIMENTS

Figure 1:
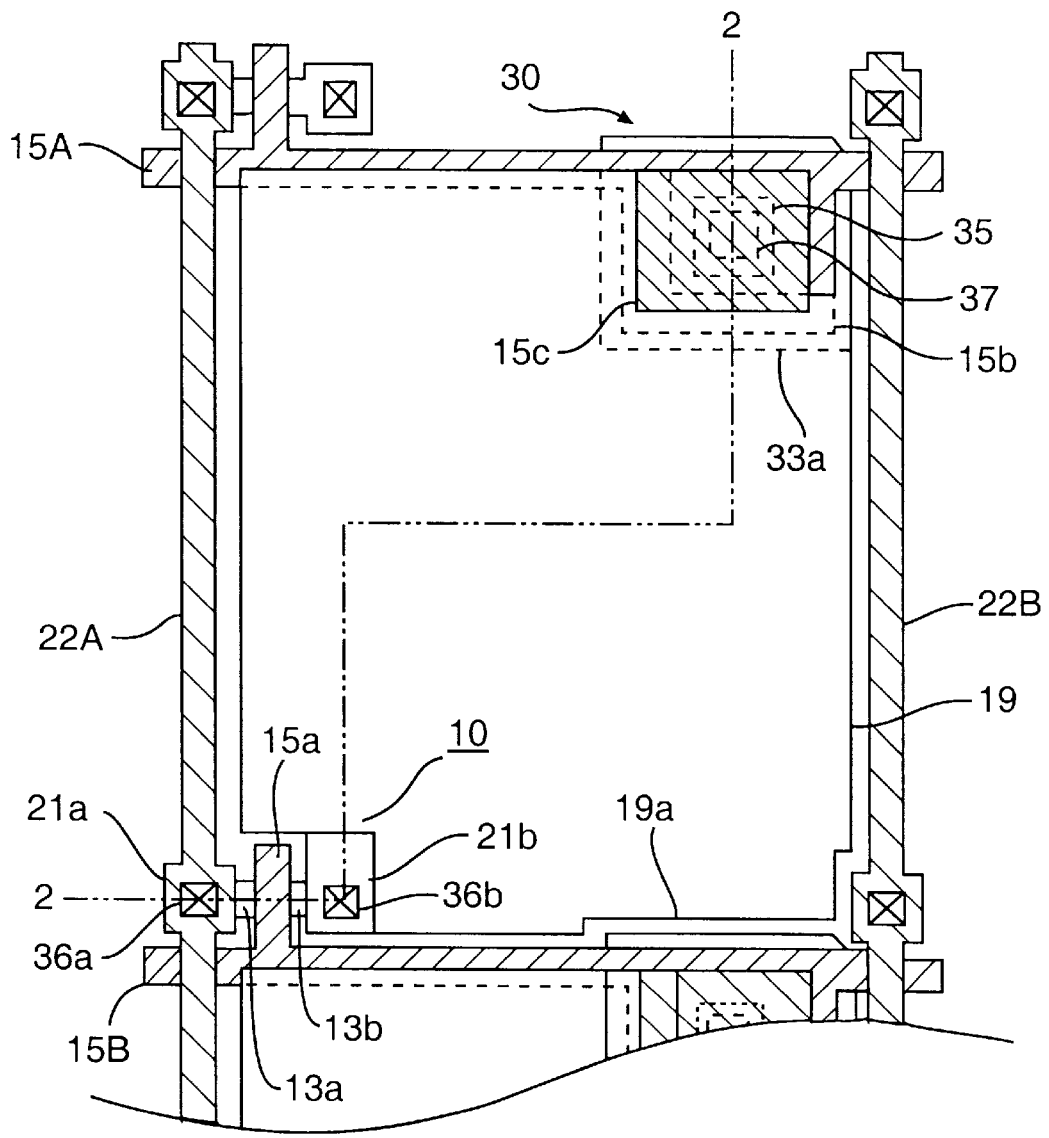
FIG. 1 is a plan view of a pixel of the liquid crystal display device according to a first embodiment of the invention.

Referring to the drawings, there will be explained hereinafter embodiments of the present invention in detail.

(First Embodiment)

Figure 2:
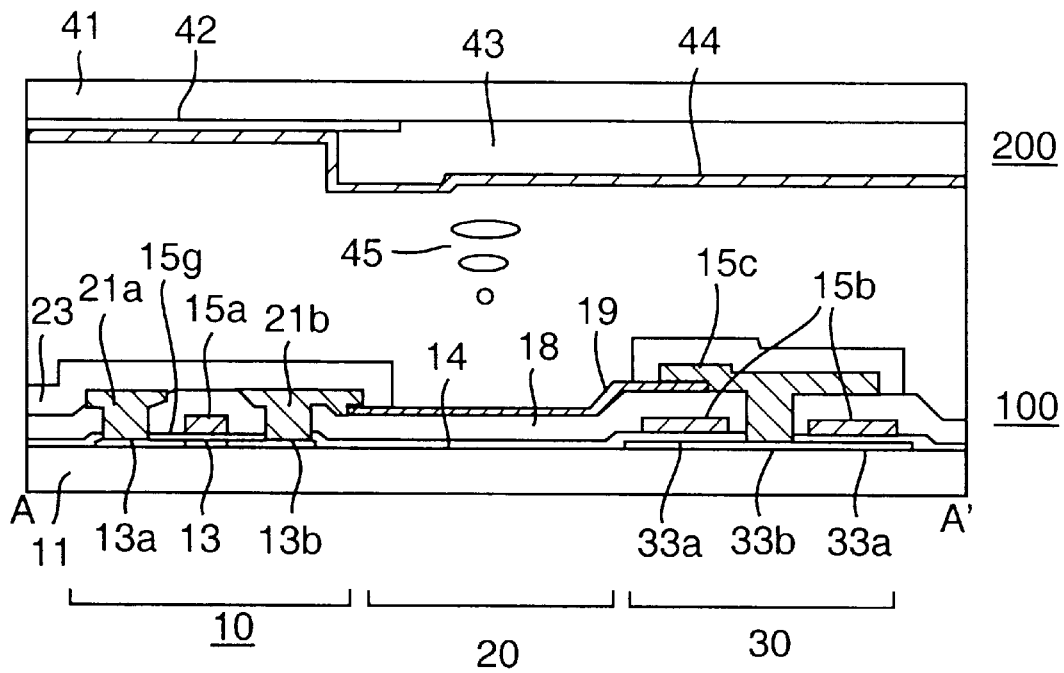
FIG. 2 is a sectional view taken along line 2—2 shown in FIG. 1.

FIG. 1 shows a structure of a pixel of a liquid crystal display device. FIG. 2 shows a sectional view taken along line 2—2 shown in FIG. 1. FIG. 2 shows a thin film transistor 10, a pixel region 20, and an auxiliary capacitor 30.

Two scanning lines 15A, 15B and two signal lines 22A, 22B are formed in a matrix fashion. The thin film transistor (called "TFT") 10 is formed at the intersection of the scanning line 15B and signal line 22A. The TFT 10 formed under the gate electrode 15a, juts out from the scanning line 15B in parallel relation with the signal line 22A.

As shown in FIG. 2, a semiconductor layer 13 is formed on a glass substrate 11, and a gate electrode 15a is formed on the semiconductor layer 13 through a gate insulating layer 15g. A drain region 13a and a source region 13b is formed in both sides of the semiconductor layer 13. The TFT 10 is composed of these elements described above.

The drain region 13a is connected to the signal line 22A through a drain electrode 21a, and the source region 13b is connected to a pixel electrode 19 through a source electrode 21b. The pixel electrode 19 is occupies the greater part of the aperture defined surrounded by the scanning lines 15A, 15B, and the signal lines 22A, 22B. The pixel electrode 19 does not occupy the regions of TFT 10 and the auxiliary capacitor 30.

The auxiliary capacitor 30 may be located at the corner opposite from where the TFT 10 is located. Since the TFT 10 generally has n-type conductivity and the auxiliary capacitor 30 generally has p-type conductivity, when the TFT 10 and the auxiliary capacitor 30 are located in one corner, a certain space between the TFT 10 and the auxiliary capacitor 30 is required in order to separate them from each other, thus causing a decrease of aperture ratio.

The auxiliary capacitor 30 comprises a lower electrode 33a which is square shaped to and composed of the same material as the semiconductor 13 of TFT 10, a gate insulating layer 14 formed on the lower electrode 33a, and an upper electrode 15b on the gate insulating layer. The upper electrode 15b is square shaped and composed of metal material.

An intermediate layer 18 covers the upper electrode 15b. The upper electrode 15b has a contact hole 35 at the portion corresponding to the center portion of the lower electrode 33a. The intermediate layer 18 also has a contact hole 37 at the portion corresponding to the center portion of the lower electrode 33a, which is smaller in area than the contact hole 35. The center portion of the lower electrode 33a is transformed into high concentrated impurity region 33b by an ion doping process through the contact hole 35 as described later. The high concentrated impurity region 33b is connected to a contact electrode 15c formed in the contact hole 37, and the contact electrode 15c is connected to the pixel electrode 19.

Hereinafter, the manufacturing process of the liquid crystal display device of this embodiment will be explained by referring to FIG. 4 through FIG. 12.

Figure 4:
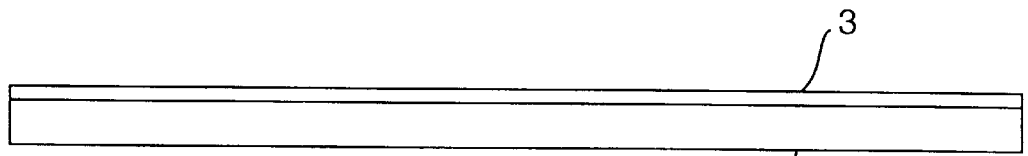
FIGS. 4 through 12 are production process diagrams of the liquid crystal display device according to a first embodiment of the invention.
Figure 5:
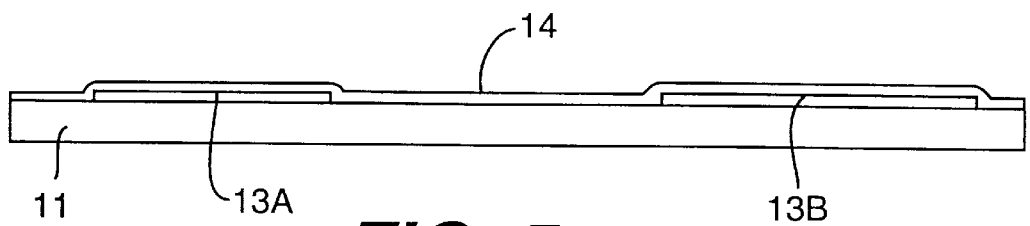

As shown in FIG. 4, an amorphous silicon (called "a-Si") is formed on one main surface of a glass substrate 11 by a method of plasma enhanced chemical vapor deposition (called "PE-CVD"). The a-Si layer is 30~100 nm in thickness.

Next, the a-Si layer is irradiated with a XeCl excimer laser with a wavelength of 308 nm so that the a-Si layer is changed into a polycrystalline silicon (called "p-Si") layer. The p-Si layer is further processed through a photolithography technique to make the semiconductor layer 13 of the TFT 10 and the lower electrode 33 of the auxiliary capacitor 30 island-like in configuration, (see FIG. 5).

Next, a 50~500 nm thick gate insulating layer 14 made of silicon oxide (called "SiOx") is formed on the glass substrate 11 by PE-CVD.

In the next process, a 100~500 nm thick metal material selected from such metals as Ta, Ti, Cr, Al, Mo, W, and Cu, etc. and an alloy thereof is formed on the glass substrate 11 by a sputtering process. An etching process by photolithography is applied thereto to make the scanning line 15B, the gate electrode 15a, and the upper electrode 15b of the auxiliary capacitor 30, as referring to FIG. 6. During this process, the contact hole 35 is formed in the upper electrode 15b at the location corresponding to the center of the lower electrode 33.

Figure 3:
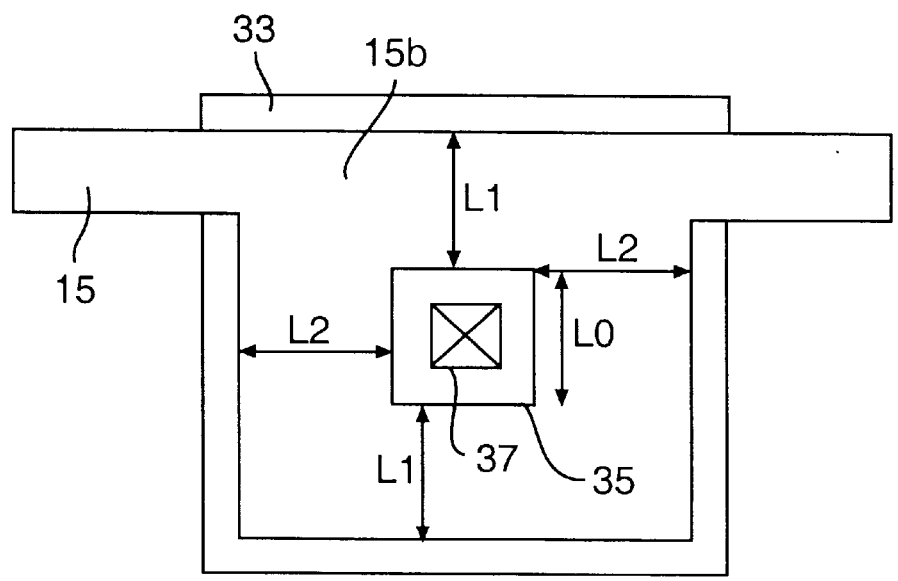
FIG. 3 is a spread plan view of an auxiliary capacitor.

Hereinafter, shown in FIG. 3., there will be described the configuration of the contact hole 35 in this embodiment. The contact hole has a square shape, and the length of a side (L0) is 8 microns. This contact hole 35 needs to be larger than the contact hole 37, in order to form the contact hole 37 in the region of the contact hole 35 in the following process. It is therefore desirable that L0 is 5~15 microns.

As the length from a side of the contact hole 35 to an edge of the upper electrode 15b in a first direction is L1 and the length in a second direction is L2, the length of L1 is 8 microns and L2 is 9 microns. The lengths of L1 and L2 needs to be longer than the predetermined length in order to function fully as an auxiliary capacitor. However, since L1 and L2 are an effective channel of the auxiliary capacitor, the shorter they are, the quicker the response of the auxiliary capacitor will be, and as a result, the characteristic of the display improves. Furthermore, this shortness reduces the time required for the hydrogenation process, described later, which is carried out in order to terminate the dangling bonds remaining in the semiconductor layer. In view of what is described above, it is therefore desirable that L1 and L2 are no longer than 20 microns.

Figure 6:
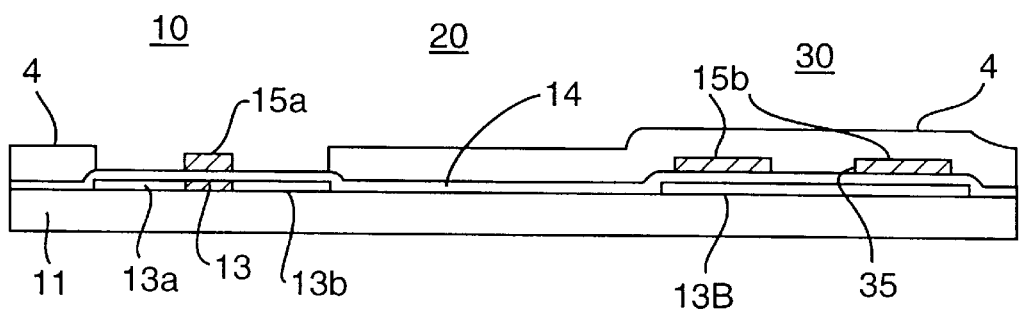

Next, referring to FIG. 6., impurities, such as phosphorus, are doped into the semiconductor layer 13 using the gate electrode 15a as a mask, and thereby the regions are transformed into a drain region 13a and a source region 13b of the TFT 10. At this time, the lower electrode 33 and the pixel region are covered with resist 4 in order to prevent impurities from being doped into them.

Figure 7:
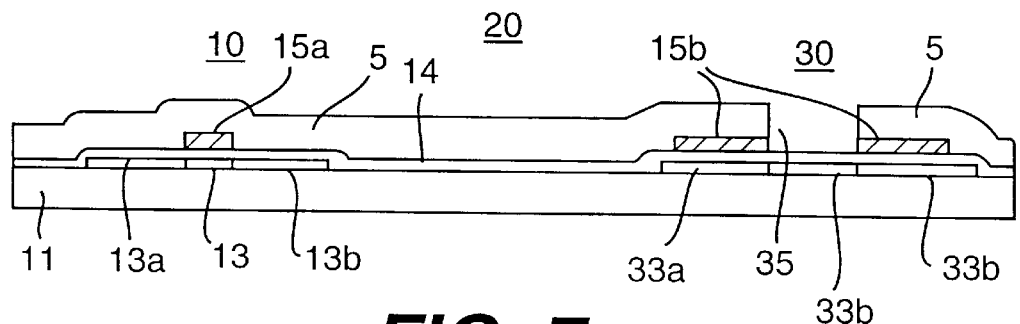
Figure 8:
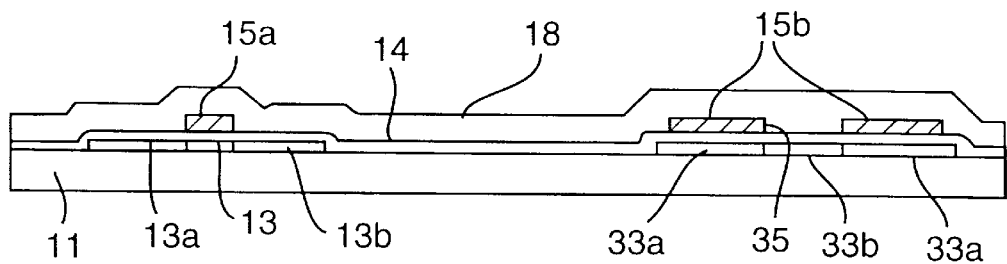
Figure 9:
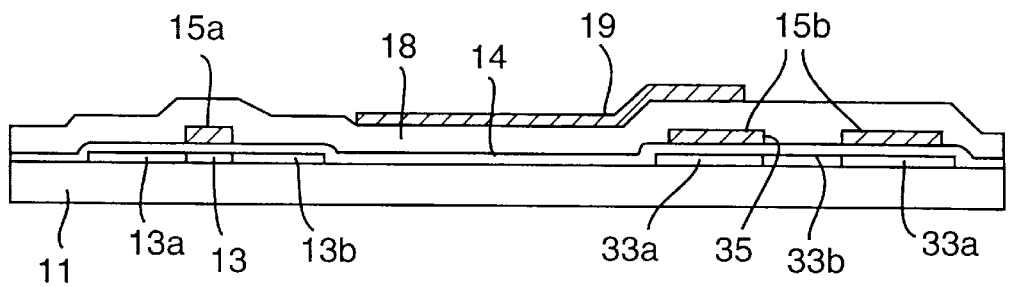

Next, referring to FIG. 7., resist 5 is formed to cover the portions of the TFT 10 and the pixel region in order to prevent impurities from being doped into them, and then impurities such as boron are doped into the center portion of the lower electrode 33 using through the upper electrode 15b as a mask. The region is turned into high concentrated impurity region 33b by the doping. And there is non-doped region 33a covered with the upper electrode 15b.

After the resist 5 is removed, (see FIG. 8) a 100~800 nm thick intermediate layer, such as SiOx, is formed on the glass substrate 11 by PE-CVD. Then the glass substrate 11 is exposed to hydrogen plasma at 350° C. in order to hydrogenate the semiconductor layer 13 and the lower electrode 33. By this hydrogenation process, the dangling bonds of the semiconductor layer 13 and the lower electrode 33 are terminated. At this time, the hydrogen spreads into the lower electrode 33 not only from the edge region but also from the high concentrated impurity region 33b, because the high concentrated impurity region is not covered with the upper electrode 15b. In a word, the hydrogenation is promoted from both the outer and inner regions of the lower electrode 33. So the hydrogen is doped into the lower electrode 15b from multiple directions. It is thus possible for the hydrogenation process to take a short time.

Next, a 10~200 nm thick indium tin oxide (called "ITO") film is formed on the glass substrate 11, and then is patterned by photolithography in order to make a pixel electrode 19.

Figure 10:
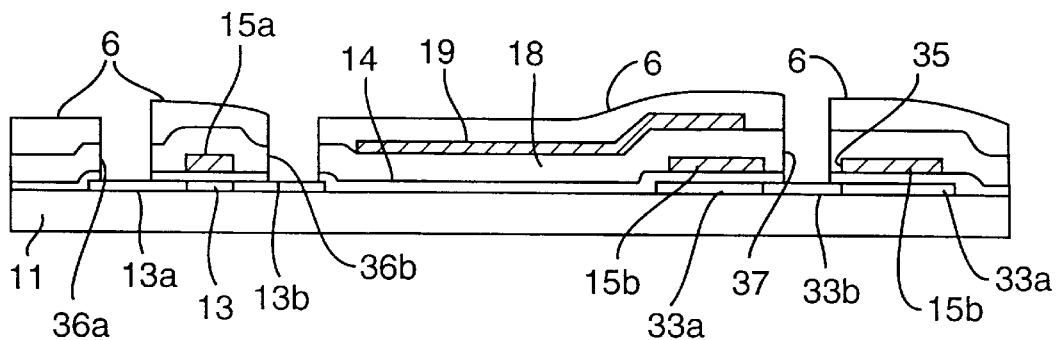
Figure 11:
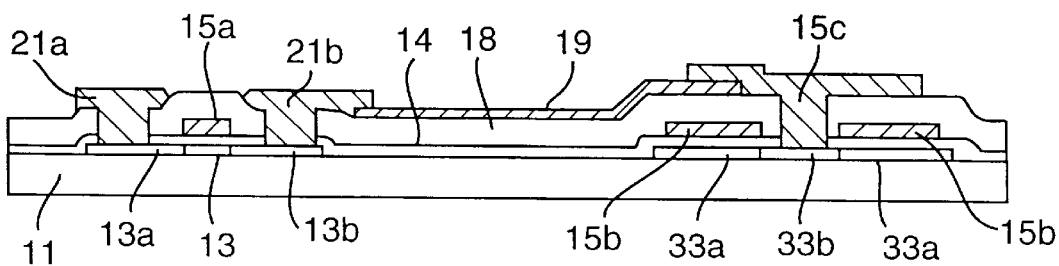

As referring to FIG. 10., the contact holes 36a, 36b are formed in the intermediate layer 18 and the gate insulating layer so as to extend to the drain region 13a and the source region 13b, respectively. In the same process, the contact hole 37 is formed in the same layer so as to extend to the high concentrated impurity region 33b. It is desirable that the center points of the contact hole 37 and the contact hole 35 are located at the same point, and that the contact hole 37 is smaller in area than contact hole 35 for the alignment margin. The length of a side of the contact hole 37 is preferably 4 microns in this embodiment. The length may be about 3~6 microns.

Next, after the resist 6 is removed, a 100~800 thick metal material, such as Ta, Ti, Cr, Al, Mo, W, Cu, or an alloy thereof, is formed on the glass substrate 11 by a sputtering method. Then the metal layer is patterned to form the signal lines 22, the drain electrode 21a connected to the drain region 13a through a contact hole 36a, the source electrode 21b connected to the source region 13b through a contact hole 36b, and the contact electrode 15c.

Figure 12:
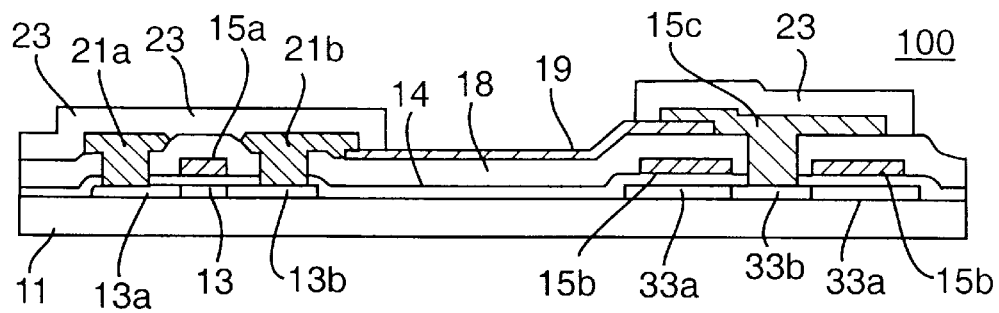

Referring to FIG. 12, a protective layer, such as silicon nitride (called "SiNx"), is coated to cover the glass substrate 11 by PE-CVD, and is patterned into a predetermined form so as to be removed in the region of the pixel electrode 19 that is formed.

Next, an alignment film composed of polyimide is coated over the substrate, and then the alignment film is given an aligning treatment, that is rubbing.

As described above, a desired array substrate 100 is produced.

Hereinafter, there will be explained a counter substrate 200. Referring to FIG. 2, light shielding material, such as Cr, is formed on a glass substrate 41 and is patterned into a predetermined shape so as to form light shielding layer 42. Then a color filter 43 composed of Red, Green, and Blue is formed. Next, an ITO, that is a counter electrode 44, is formed on the color filter 43, furthermore an alignment film is formed on the counter electrode 44 and is given an aligning treatment. A desired counter substrate 200 is produced in this way.

The array substrate 100 and the counter substrate 200 are sealed together with spacers 4~5 microns in diameter. A liquid crystal material is injected into the space between the array substrate 100 and the counter substrate 200. In this way, a liquid crystal display device of this embodiment is produced.

The liquid crystal display device produced by the method described above has many advantages. One of them is that the response speed of the auxiliary capacitor 30 is improved. In addition, the capacitance of the auxiliary capacitor 30 is kept uniform, although the alignment of the relation between the upper electrode 15b and the lower electrode 33 is slightly missed. As a result, the characteristics of the display are improved remarkably. Further, since the contact hole 35 is used not only as a contact of the pixel electrode and lower electrode but also for hydrogenating and impurity doping, the time of the hydrogenation process can be cut down without reducing aperture ratio. Further, the manufacturing cost is reduced because the time required for the hydrogenation process is reduced.

(Second Embodiment)

Next, referring to FIG. 13, there will be explained hereinafter the second embodiment of the present invention.

In this embodiment, a capacitor line 50B separated from the scanning line 15B is formed. A part of the capacitor line functions as an upper electrode 50b of an auxiliary capacitor 300.

Figure 13:
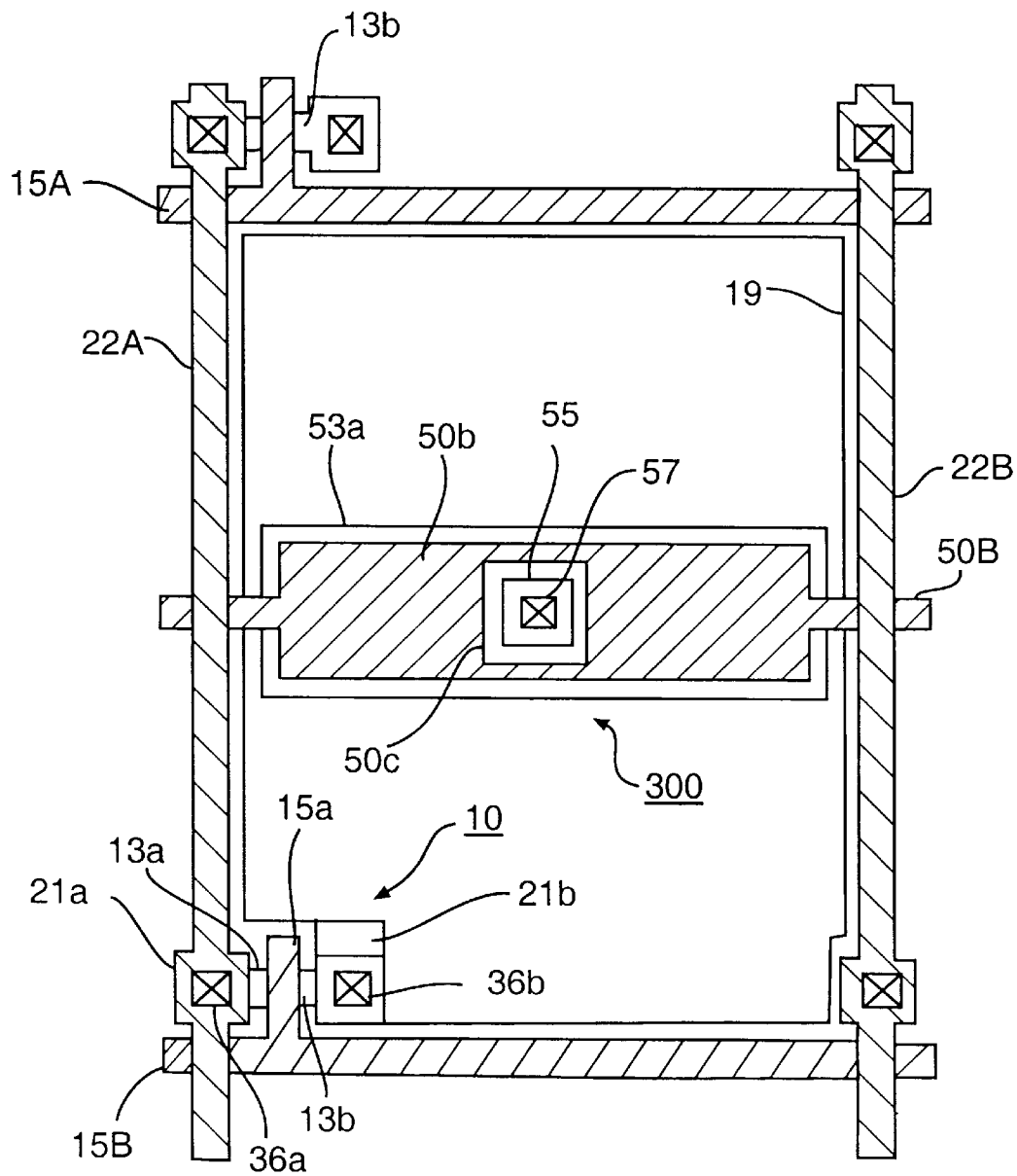
FIG. 13 is a plan view of a pixel of the liquid crystal display device according to a second embodiment of the invention.

Shown in FIG. 13, the composition of the TFT 10 is the same as in the first embodiment. It is also the same as the first embodiment insofar as the pixel electrode 19 is connected to the source region 13b through the source electrode 21b, and the pixel electrode 19 is connected to an lower electrode 53a through a contact electrode 50c formed in contact holes 55, 57.

In the first embodiment, the impurity doped into the lower electrode 33 is different form that doped into the semiconductor layer 13 specifically, the former is phosphorus with n-type conductivity, and the latter is boron with p-type conductivity. In the second embodiment, however, the impurity doped into the lower electrode 53a may be same as that doped into the semiconductor layer 13 and may be doped during the same process. The auxiliary capacitor is able to function rightly with the composition described above, since the capacitor line is formed separately from the scanning line 15B.

Although the length of the channel of the auxiliary capacitor 300 in the second embodiment is slightly longer than that in the first embodiment, it does not cause any problems substantially. The device in this embodiment has the same advantages as the first embodiment. Furthermore, it has an another advantage of further reducing the manufacturing cost, since it is possible to dope into the semiconductor layer 13 and the lower electrode 53a at the same time.

(Third Embodiment)

Figure 14:
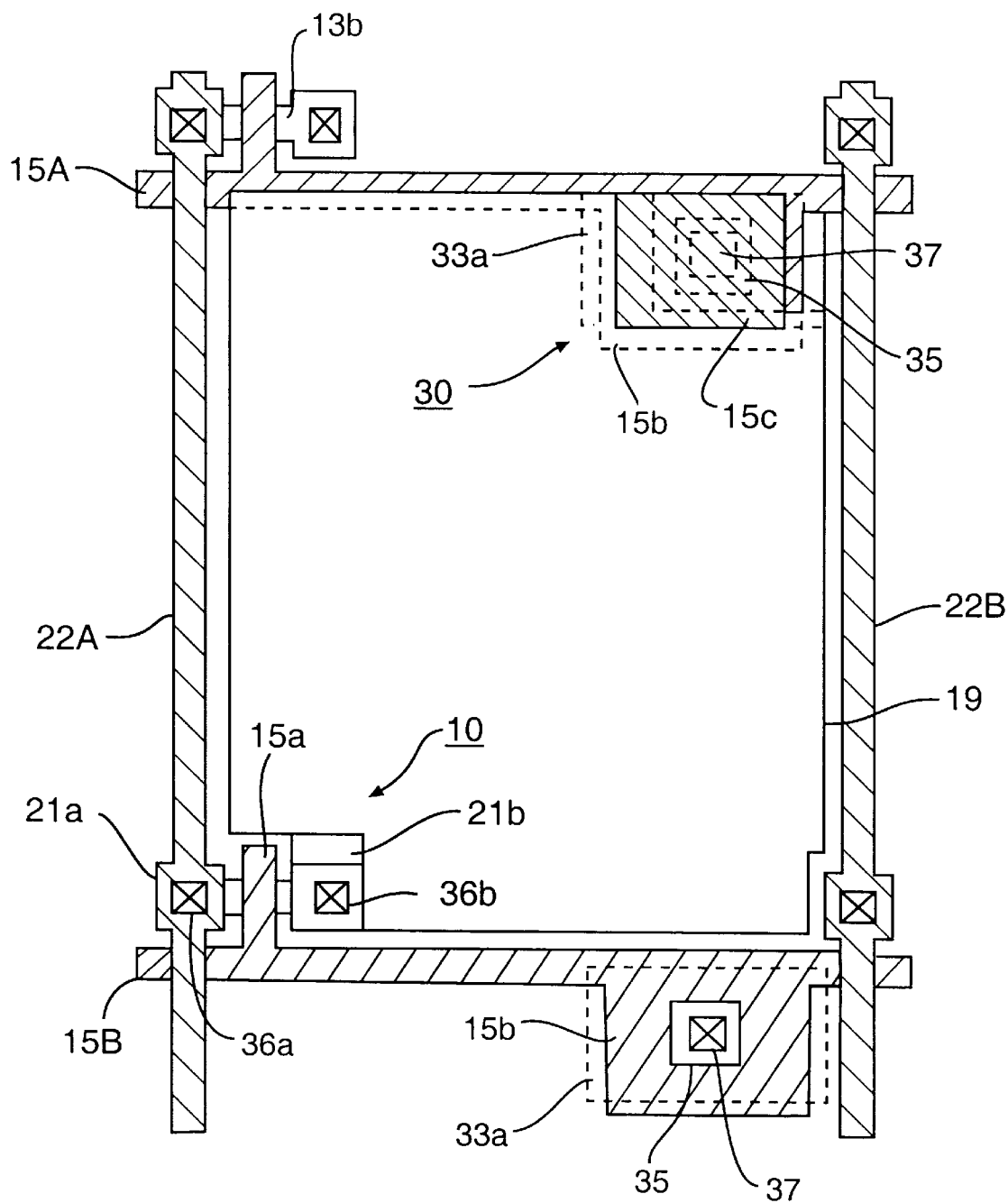
FIG. 14 is a plan view of a pixel of the liquid crystal display device according to a third embodiment of the invention.

Next, referring to FIG. 14., there will be explained hereinafter the third embodiment of the present invention.

In the third embodiment, the length of the upper electrode 15b is shorter than the lower electrode 33a in the direction perpendicular to the scanning line 15A. In this embodiment, since the lower electrode 33a does not jut out into the region of next pixel electrode formed, there is no undesirable effect of a capacitor forming between the lower electrode 33a and the next pixel electrode. In order to avoid the undesirable capacitor, in the first embodiment, the pixel electrode 19 has a dent 19a. In the third embodiment, since there is no need to form the dent 19a, the pixel electrode 19 can be formed so as to extend that region. As a result, the aperture ratio which contributes to the quality of the display characteristic is higher than in the first embodiment.

In this embodiment, hydrogen does not fully spread into the lower electrode 33a from the edge covered with the upper electrode 15b during the hydrogenation process. However, since the length from the edge of the contact hole 35 to the edge of the lower electrode 33 covered with upper electrode 15b is short, and the hydrogen spreads into the lower electrode 33a from the region corresponding to contact hole 35, the hydrogenation process takes as short a time as it takes in the first embodiment. By adjusting the size or the length of a side of the contact hole 35, it is possible to adjust the time required for the hydrogenation process.

Furthermore, the response time of the auxiliary capacitor 30 in this embodiment is as fast as in the first embodiment.

Although, in the first and the third embodiments, the upper electrode 15b has a contact hole 35 located in the center portion, it does not necessarily have to be located in the center portion, and does not necessarily have to be rectangular-shaped. It may be located anywhere and may be formed into any shape so as to improve the time required for hydrogenation.

Figure 15:
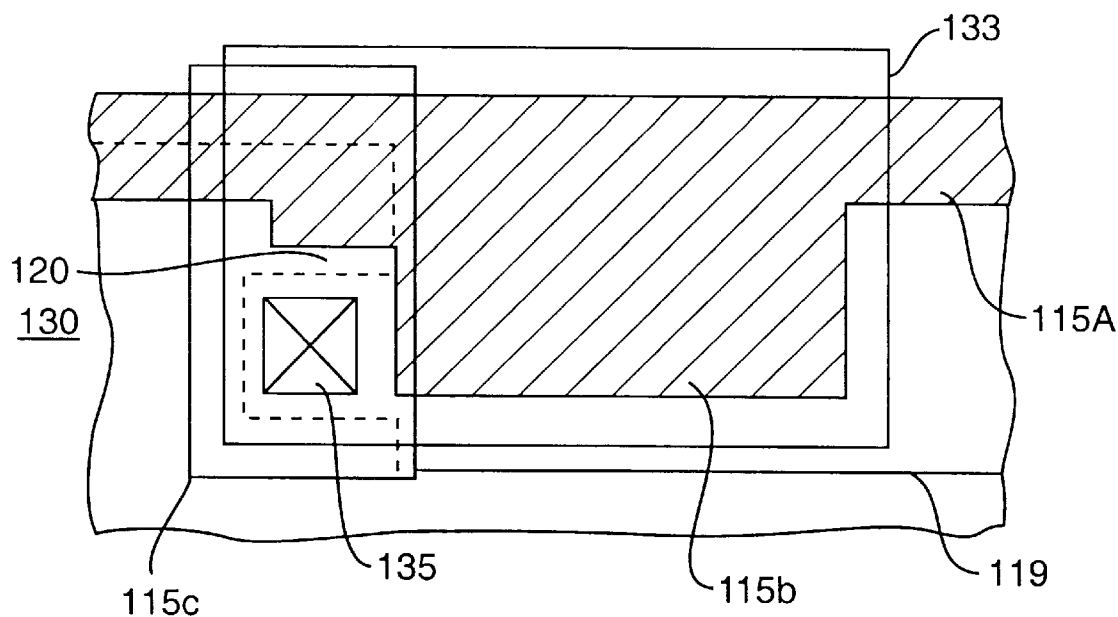
FIG. 15 is a plan view of a pixel of the liquid crystal display device according to a fourth embodiment of the invention.
Figure 16:
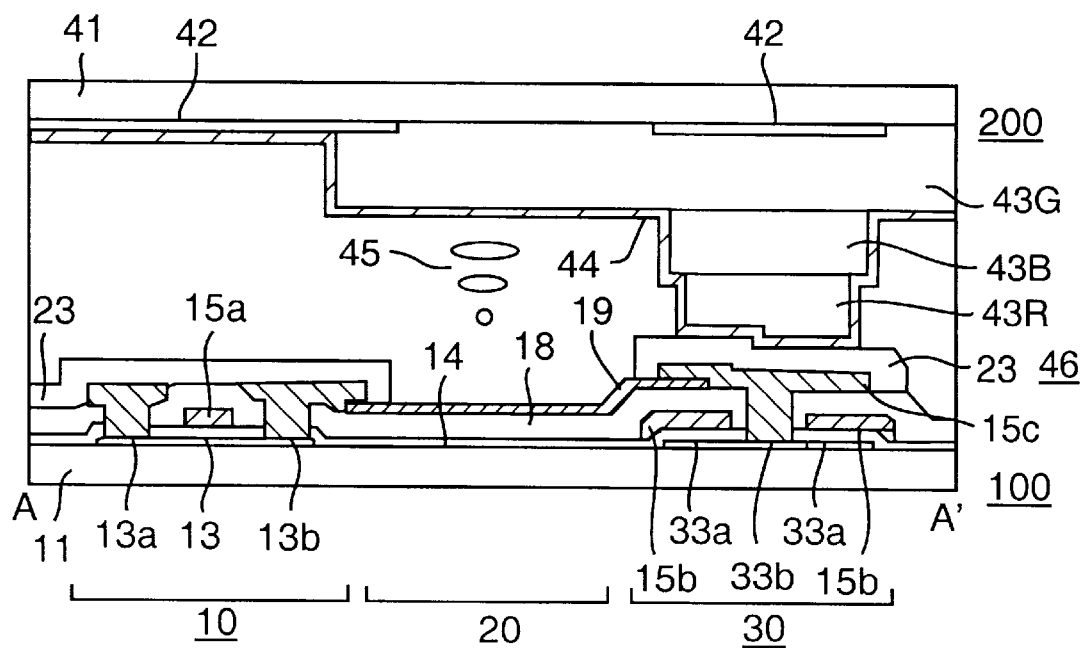
FIG. 16 is a sectional view of a modification of FIG. 1.

FIG. 15 is an example of the composition described above. The auxiliary capacitor 130 comprises a lower electrode 133, an insulating layer on the lower electrode 133, and an upper electrode 115b overlapping the lower electrode 133. Further, an intermediate layer is formed on the upper electrode 115b. A pixel electrode 119 is formed on the intermediate layer and is connected to the lower electrode 133 through a contact electrode 115c formed in the contact hole 135.

Compared with the former embodiments, instead of the contact hole at the center portion of the upper electrode, a notch region 120 is formed at a corner of the upper electrode 115b. A region of the lower electrode 133 corresponding to the notch region 120 is turned into a high concentrated impurity region by a doping process.

In this embodiment, the hydrogen is doped into the lower electrode 133 from the edges uncovered with the upper electrode 115*b* and from a region corresponding to the notch region 120. The hydrogenation process in this embodiment also takes a short time and the hydrogen is doped into the lower electrode 133 fully as in the former embodiment. Further, it is possible to control the time needed for the hydrogenation by varying the location of the notch region.

In the first and the third embodiments, a columnar spacer 46 made of the same material as the color filter may be used between the array substrate 100 and the counter substrate 200, instead of the pearl-like spacer generally used. The columnar spacer can be made in the same time as that required for the process for making color filters 43R, 43B, 43G. There is the need to change the photo mask for patterning the color filters so the filters are piled on top of each other at the location designated portion for the columnar spacers. Since, each of the color filters 43R, 43B, 43G is made of resin material 1~2 microns in thickness, the height of the columnar spacer 46 may be about 3~6 microns. Further, in case the location of the columnar spacer 46 is on the auxiliary capacitor 30, the area of the aperture for display is not reduced.

The liquid crystal display device using the columnar spacer realizes a high contrast display without leakage of light that occurs around the pearl-like spacer. Further, the composition of a protective layer 23 made of an insulating material held between the counter electrode 44 and the contact electrode 15*c* function as capacitor. In other words, the device of this embodiment has a second auxiliary capacitor. Therefore, since it is possible to reduce the size of the auxiliary capacitor 30, the aperture ratio is able to be further improved.

In accordance with the invention as mentioned above in detail, it is possible to hydrogenate in a short time, to improve the speed of response of the auxiliary capacitor, and to reduce the number of the dangling bonds in the lower electrode of the auxiliary capacitor. Therefore, the reliability of the auxiliary capacitor and the characteristics of the display are improved with this invention.

Numerous modifications and variations of the present invention are possible in light of the above teachings. It is therefore to be understood that, within the scope of the appended claims, the present invention can be practiced in a manner other than as specifically described herein.

What is claimed is:

1. A liquid crystal display device comprising:
    an array substrate;
    a plurality of scanning lines and signal lines on said array substrate in a matrix fashion;
    a plurality of thin film transistors each in the vicinity of an intersection of said scanning lines and said signal lines;
    a plurality of pixel electrodes each connected to one of said thin film transistors;
    a plurality of auxiliary capacitors each connected to one of said pixel electrodes, each of said auxiliary capacitors including a first electrode over said array substrate, an insulating layer over said first electrode, and a second electrode over said first electrode, said insulating layer being between said first electrode and said second electrode;
    a counter substrate opposite said array substrate; and
    a liquid crystal layer between said array substrate and said counter substrate;
    said second electrode having an opening region overlapping said first electrode and being enclosed on all sides,
    each of said pixel electrodes being connected to said first electrode through a contact hole of said insulating layer, and
    said first electrode having an edge region extending from an edge of said second electrode in a plane.

2. The liquid crystal display device according to claim 1, wherein said first electrode comprises polycrystalline silicon.

3. The liquid crystal display device according to claim 1, wherein said second electrode is one with said scanning line.

4. The liquid crystal display device according to claim 1, wherein said thin film transistor has a semiconductor layer including a source region and a drain region doped with a first conductivity type impurity, and wherein said edge region and said opening region contain a second conductivity type impurity different in conductivity from said first conductivity type impurity.

5. The liquid crystal display device according to claim 4, wherein said first conductivity type is n-type, and said second conductivity type is p-type.

6. The liquid crystal display device according to claim 4, wherein said scanning lines include a first scanning line and a second scanning line next to said first scanning line,
    wherein said signal lines include a first signal line and a second signal line next to said first signal line,
    wherein said thin film transistor is located in the vicinity of a cross point of said first scanning line and said first signal line, and
    wherein said auxiliary capacitor is located in the vicinity of a cross point of said second scanning line and said second signal line.

7. The liquid crystal display device according to claim 1, wherein said second electrode comprises a light shielding material.

8. The liquid crystal display device according to claim 1, further comprising:
    a plurality of columnar spacers between said array substrate and said counter substrate,
    wherein at least one of said columnar spacers is located on said second electrode.

9. A liquid crystal display device comprising:
    an array substrate;
    a plurality of scanning lines and signal lines on said array substrate in a matrix fashion;
    a plurality of thin film transistors each in the vicinity of an intersection of said scanning lines and said signal lines;
    a plurality of pixel electrodes each connected to said thin film transistors;
    a plurality of auxiliary capacitors each connected to one of said pixel electrodes, each of said auxiliary capacitors including a first electrode over said array substrate, an insulating layer over said first electrode, and a second electrode over said first electrode, said insulating layer being between said first electrode and said second electrode;
    a counter substrate opposite said array substrate; and
    a liquid crystal layer between said array substrate and said counter substrate;
    said second electrode having a notch region over said first electrode,
    said first electrode including an impurity region doped with impurities and substantially self-aligned with said notch region, and including an edge region extending from an edge of said second electrode in a plane, and
    each of said pixel electrodes electrically connected by contact to said first electrode at said impurity region through a contact hole of said insulating layer.

10. The liquid crystal display device according to claim 9, wherein each of said pixel electrodes is electrically connected to said first electrode through a contact electrode, and
wherein said contact electrode touches said impurity region.

11. A method of manufacturing a liquid crystal display device comprising the steps of:

forming a semiconductor layer on an array substrate;

patterning said semiconductor layer to form a first electrode;

forming a first insulating layer over said first electrode;

forming a conductive layer on said insulating layer, patterning said conductive layer to form a second electrode over said first electrode so as to uncover an edge region of said first electrode, and so as to have a notch region located over said first electrode;

hydrogenating said first electrode covered by said second electrode;

forming a second insulating layer on said second electrode;

forming a contact hole in said first and second insulating layer extending to said first electrode; and forming a pixel electrode on said second insulating layer so as to be connected to said first electrode through said contact hole.

12. A method of manufacturing a liquid crystal display device comprising the steps of:

forming a semiconductor layer on an array substrate;

patterning said semiconductor layer to form a first electrode;

forming a first insulating layer over said first electrode;

forming a conductive layer on said insulating layer;

patterning said conductive layer to form a second electrode over said first electrode so as to uncover an edge region of said first electrode and so as to have an opening region enclosed on all sides and located over said first electrode;

hydrogenating said first electrode covered by said second electrode;

forming a second insulating layer on said second electrode;

forming a contact hole in said first and second insulating layer extending to said first electrode; and forming a pixel electrode on said second insulating layer so as to be connected to said first electrode through said contact hole.

* * * * *